United States Patent
Ge et al.

(10) Patent No.: US 10,345,493 B2
(45) Date of Patent: *Jul. 9, 2019

(54) OPTICAL DIFFUSION BLEND MATERIALS FOR LED LIGHTING

(71) Applicant: Arkema France, Colombes (FR)

(72) Inventors: Jiaxin J. Ge, Lower Providence, PA (US); Michael T. Burchill, Langhorne, PA (US); Gary A. Hall, Oaklyn, NJ (US); Florence Mehlmann, Berwyn, PA (US)

(73) Assignee: Arkema France, Colombes (FR)

( * ) Notice: Subject to any disclaimer, the term of this patent is extended or adjusted under 35 U.S.C. 154(b) by 76 days.

This patent is subject to a terminal disclaimer.

(21) Appl. No.: 15/407,011

(22) Filed: Jan. 16, 2017

(65) Prior Publication Data

US 2017/0123116 A1    May 4, 2017

Related U.S. Application Data

(63) Continuation-in-part of application No. 14/629,903, filed on Feb. 24, 2015, now Pat. No. 9,547,108.

(51) Int. Cl.
*G02B 5/02* (2006.01)
*G02B 1/04* (2006.01)

(52) U.S. Cl.
CPC ............ *G02B 5/0268* (2013.01); *G02B 1/04* (2013.01); *G02B 5/0242* (2013.01); *G02B 5/0278* (2013.01)

(58) Field of Classification Search
CPC .......... G02B 5/0268; G02B 5/02; G02B 1/04
USPC ........................................................ 524/423
See application file for complete search history.

(56) References Cited

U.S. PATENT DOCUMENTS

| | | | | |
|---|---|---|---|---|
| 9,547,108 B2* | 1/2017 | Ge | ........................ | G02B 5/0242 |
| 2003/0128313 A1* | 7/2003 | Kaminsky | ............ | G02B 5/0242 |
| | | | | 349/112 |
| 2003/0218192 A1* | 11/2003 | Reilly | ....................... | B32B 5/16 |
| | | | | 257/200 |
| 2008/0242786 A1* | 10/2008 | Garcia-Leiner | .......... | C08K 3/22 |
| | | | | 524/423 |
| 2010/0270577 A1* | 10/2010 | Rulkens | ............... | C08G 69/265 |
| | | | | 257/99 |

* cited by examiner

*Primary Examiner* — Deve E Valdez
(74) *Attorney, Agent, or Firm* — Thomas F. Roland (57) ABSTRACT

The invention relates to blend materials useful in LED lighting applications. The diffusing particle blend is a synergistic mixture of selected organic particles and selected inorganic particles of specific composition, loading, and a refractive index difference with the matrix polymer, that provide excellent light diffusion, high hiding properties and good light transmission. Articles made of this blend are useful in commercial and residential lighting, motor vehicle illumination (lights, panels), street lighting, displays and signs.

20 Claims, 4 Drawing Sheets

Figure 1: 2D optical image of a 0.080" injection-molded diffusion sheet measured in Konica Minolta CA2500, in which the sheet was located at a). 0.5 inches and b). 1 inch away the LED light sources Figure 2: 2D optical image of a 0.080" injection-molded diffusion sheet (PRD20xx) measured in Konica Minolta CA2500, in which the sheet was located at a). 0.5 inches and b). 1 inch away the LED light sources

(a) (b)

Figure 3: 2D optical image of a 0.080" injection-molded diffusion sheet (PRD2036 containing 15%EXL5136+2% 3um BaSO4 in DR101) measured in Konica Minolta CA2500, in which the sheet was located at a). 0.5 inches and b). 1 inch away the LED light sources

(a) (b)

Figure 4: 2D optical image of a 0.025" thin diffusion sheet (PRD2045) measured in Konica Minolta CA2500, in which the sheet was located at a). 0.5 inches and b). 1 inch away the LED light sources

(a)                          (b)

Figure 5: 2D optical image of a 0.032" thin diffusion sheet (PRD2046) measured in Konica Minolta CA2500, in which the sheet was located at a). 0.5 inches and b). 1 inch away the LED light sources (a)                          (b)

Figure 6: 2D optical image of a 0.08" injection-molded diffusion sheet (2014-9-6D) measured in Konica Minolta CA2500, in which the sheet was located at a). 0.5 inches and b). 1 inch away the LED light sources (a)                  (b)

Figure 7: 2D optical image of a 0.08" injection-molded diffusion sheet (2014-9-9D) measured in Konica Minolta CA2500, in which the sheet was located at a). 0.5 inches and b). 1 inch away the LED light sources

OPTICAL DIFFUSION BLEND MATERIALS FOR LED LIGHTING

This application is a Continuation In Part Application under U.S.C. § 121 of copending U.S. application Ser. No. 14/629,903 filed Feb. 24, 2015, and claims benefit thereto, said application incorporated herein by reference.

FIELD OF THE INVENTION

The invention relates to blend materials useful in LED lighting applications. The diffusing particle blend is a synergistic mixture of selected organic particles and selected inorganic particles of specific composition, loading, and a refractive index difference with the matrix polymer, that provide excellent light diffusion, high hiding properties and good light transmission. Articles made of this blend are useful in commercial and residential lighting, motor vehicle illumination (lights, panels), street lighting, displays and signs, desktop monitors and LCD/LED TVs.

BACKGROUND OF THE INVENTION

Polymer particles are used in a polymer matrix to manage light diffusion. For example, U.S. Pat. No. 7,547,736 describes the use of particles having an average particle size of 15 to 70 microns to provide a frosted look and textured surface, and U.S. Pat. No. 8,163,827 describes a high light transmission diffusion screen having inorganic pigments and refractive index-matched particles.

Point light sources create a visible shape of the light source, and there is often a desire to hide the light source shape, creating a more diffuse lighting. As used herein, "point light source" means any shaped source of electromagnetic radiation in the 3,600-7,700 Angstrom range. This includes, but is not limited to, incandescent, fluorescent, neon, argon and LED light sources.

Light emitting diodes (LEDs) are being increasingly favored as a light source, since they use far less electricity and produce less heat than standard incandescent or fluorescent light bulbs. LEDs provide a very bright, point light source, yet the output (7000° K) often appears harsh and causes an uncomfortable glare. This is a challenge for lighting designers, as many applications demand an illumination and low glare. Light devices that integrate one or more LEDs include, for example, luminaires for commercial or residential lighting, motor vehicle illumination devices (at the front or rear), indicating panels, luminous displays, spotlights, street lighting, box-letters, etc.

These luminous devices typically consist of a light source and a cover (also called a lens or a diffuser) made of a plastic whose function is to mask and protect the light source, while still ensuring good transmission of the light emitted by the light source. The plastic may be colored or may have decorative elements or patterns. The cover also has the function of scattering the emitted light so that the illumination is softened and not dazzling. The scattering of the light emitted by the light source can be achieved by dispersing scattering particles of organic or mineral nature in the plastic.

Replacing a conventional light source with an LED results in a modification of the illumination. This is because an LED, especially an LED having a high luminous flux, exhibits directional illumination, whereas, for example the illumination of a neon tube is from 0 to 360°. In addition, the emission spectrum of an LED is completely different from that of a conventional light source.

WO 2006/100126 describes a thermoplastic cover with dispersed beads for use with LEDs to form luminous devices. 3-30% of scattering particles are dispersed in a transparent plastic. The particles can be inorganic or organic and have mean diameters of from 0.5 to 100 microns. There is no description of combinations of particle size and loading, and no teaching of hiding power.

The addition of scattering particles helps to soften the effect of the LED light source, but the scattering also reduces light transmission. Some LED lighting cover manufacturers add pigments, such as $BaSO_4$, $SiO_2$, $CaCO_3$, $AL_2O_3$, $TiO_2$ and ZnO (U.S. Pat. No. 4,418,986), to the cover to increase the hiding power, though this can dramatically decrease the light transmission. $BaSO_4$ and refractive-index-matched beads are used in a light diffusion (TV) screens in U.S. Pat. No. 8,163,827. Ground-up cell-cast sheet forms irregular particles with a wide particle size distribution, and unsatisfactory light transmission properties for LED diffusion sheets.

WO 14/055330 describes an attempt to balance the light transmission and hiding power for an LED diffuser, using a combination of different sized plastic beads.

It has now been found that good diffusion sheet for use with LED point light sources can be achieved by forming a selected blend of inorganic and organic diffusion particles in a plastic matrix. The addition of optical brighteners can further improve the color properties of a diffusion article formed from the blend.

SUMMARY OF THE INVENTION

The invention relates to a translucent, light-diffusing thermoplastic article comprising a blend composition of
 a) a thermoplastic polymer matrix material,
 b) from 0.01 to 20 weight percent of organic polymer diffusing particles that are refractive index (R.I.) mismatched to the matrix polymer, wherein the absolute difference between the matrix polymer and diffusing organic polymer particles is from greater than 0.02 to 0.2,
 c) from 0.001 to 15 weight percent of inorganic diffusing particles, wherein a sheet or film has a luminous transmission of greater than 40%, an optical haze of greater than 90% and a diffuse light scattering of greater than 85%, said weight percents based on the weight of the total light-diffusing composition.

The invention also relates to the use of the translucent, light-diffusion thermoplastic article.

DETAILED DESCRIPTION OF THE INVENTION

The invention relates to an optical diffusing article made with an optimized blend of organic and inorganic light diffusing particles, for use with point light sources. Careful selection of specified particle sizes, refractive index differences, and particle loadings are used to provide a balance of high light transmission and high hiding power.

As used herein, unless otherwise described, percent shall mean weight percent.

Polymer Matrix

The materials of the invention are composed of a transparent polymer matrix. The term "transparent polymer" denotes a thermoplastic or thermosetting polymeric material, having a light transmission in the visible range of at least 50%, preferably at least 70% and even more preferably at least 80% according to the DIN 67-507 standard (this is the light transmission of the transparent plastic with no scattering particle). Useful transparent plastics include, but are not limited to, crystal polystyrene; polyethylene terephthalate (PET); a transparent, especially clarified, polyolefin, for example clarified polypropylene; acrylics; a transparent polyamide; styrene acrylonitrile (SAN) and polycarbonate.

Acrylics, polystyrene, styrene acrylonitrile and polycarbonate are the preferred transparent plastics due to their ease of processing, commercial availability and high transparency. In addition, these two plastics exhibit excellent thermomechanical strength, allowing compact luminous devices to be produced. In the case of compact luminous devices, heat builds up and rapidly raises the temperature inside the device. While the energy efficiency of an LED (i.e. the efficiency of converting electrical energy into light energy) is much better than for an incandescent lamp, some of the energy is nevertheless converted into heat.

Acrylic polymers, as used herein, are meant to include polymers, and copolymers having two or more different monomer units that are formed from alkyl methacrylate and alkyl acrylate monomers, and mixtures thereof. The alkyl methacrylate monomer is preferably methyl methacrylate, which may make up from greater than 50 to 100 percent of the monomer mixture. 0 to less than 50 percent of other acrylate and methacrylate monomers or other ethylenically unsaturated monomers, included but not limited to, styrene, alpha methyl styrene, acrylonitrile, and crosslinkers at low levels may also be present in the monomer mixture. Suitable acrylate and methacrylate comonomers include, but are not limited to, methyl acrylate, ethyl acrylate and ethyl methacrylate, butyl acrylate and butyl methacrylate, iso-octyl methacrylate and iso-octyl acrylate, lauryl acrylate and lauryl methacrylate, stearyl acrylate and stearyl methacrylate, isobornyl acrylate and isobornyl methacrylate, methoxy ethyl acrylate and methoxy methacrylate, 2-ethoxy ethyl acrylate and 2-ethoxy ethyl methacrylate, and dimethylamino ethyl acrylate and dimethylamino ethyl methacrylate monomers. (Meth) acrylic acids such as methacrylic acid and acrylic acid can be useful for the monomer mixture. Most preferably the acrylic polymer is a copolymer having 70-99.5 weight percent and more preferably 80 to 99 percent of methyl methacrylate units and from 0.5 to 30 weight percent of one or more $C_{1-8}$ straight or branched alkyl acrylate units.

The acrylic polymer can be an alloy with one or more compatible polymers. Preferred alloys are PMMA/polyvinylidene fluoride (PVDF) alloys, and PMMA/polylactic acid (PLA) alloys The alloy contains 2 to 95 weight percent, preferably 5 to 90 weight percent, and more preferably 20-80 weight percent of the PMMA homopolymer or copolymer, and 5 to 98 weight percent, preferably 10 to 95 weight percent and more preferably 20 to 80 weight percent of the compatible polymer.

The transparent polymer matrix may contain additives, including impact modifiers, and other additives typically present in polymer formulations, including but not limited to, stabilizers, plasticizers, fillers, coloring agents, pigments, dyes, antioxidants, antistatic agents, surfactants, toner, refractive index matching additives, additives with specific light diffraction, light absorbing, or light reflection characteristics, and dispersing aids. In one embodiment, an additive is provided to help prevent degradation of the composition upon exposure to radiation, such as high levels of UV radiation or gamma radiation. Useful radiation stabilizers include, but are not limited to, poly(ethylene glycol), poly (propylene glycol), butyl lactate, and carboxylic acids such as lactic acid, oxalic acid, acetic acid, or a mixture thereof.

Useful impact modifiers include block copolymers, graft copolymers, and core/shell impact modifiers that are refractive-index matched to the matrix polymer. The impact modifier may be present at a level of from 0 to 80 weight percent, preferably 5 to 45, and more preferably from 10 to 30 weight percent, based on the total layer of matrix polymer and all additives. The level of impact modifier can be adjusted to meet the toughness needs for the end use of the composition. Core-shell impact modifiers are multi-stage, sequentially-produced polymer having a core/shell particle structure of at least two layers. Preferentially, the core-shell modifier comprises three layers made of a hard core layer, one or more intermediate elastomeric layers, and a hard shell layer.

Organic Particles

The organic (polymeric) diffusing particles of the invention are spherical or near-spherical, have a mean particle size of either from 0.6 to 100 microns, preferably from 1 to 80 microns, and more preferably from 2 to 65 microns. Any particle size distribution can be used, though the particle size distribution is preferably relatively narrow, with 90 percent of the particles being within +/−50% of the mean particle size. The mean particle size (mean diameter), and particle size distribution, are determined by Hitachi SU8010 field emission. Scanning electron microscope (SEM).

The organic particles are present in the diffusing material at from 0.01 to 15 weight percent, preferably from 0.1 to 10 weight percent, and most preferably from 0.2 to 8 weight percent, based on the total weight of the diffusing material. A higher loading of particles generally provides an increase in hiding power, with a corresponding reduction in light transmission.

The particles must be spherical or near spherical to provide a good balance of diffusing properties and good light transmission. As an example, they can be formed from suspension or emulsion synthesis. Particles formed from the grinding of cast sheet will be irregular and will decrease performance.

The polymer diffusing particles may consist of a single composition and size, or may be a mixture of two or more different compositions and/or sizes. The particles may be homogeneous, or may be of a core-shell morphology with either a soft or a hard core, and one or more shells.

The difference between the refractive indices (measured according to ASTM D 542) of the diffusing particles and of the transparent plastic should be greater than 0.02 and up to 0.2 and preferably between 0.03 and 0.1.

The diffusing particles maintain their shape and resist deformation under normal processing conditions of heat and pressure during incorporation into the polymer matrix and subsequent formation into articles. The particles can either be high Tg polymers, such as fluoropolymers or polyamides, or may be crosslinked polymer beads. Useful polymer particles of the invention include, but are not limited to, polyamide and copolyamide particles, styrene-based particles (comprising greater than 50 percent by weight styrene monomer units), silicone particles, polytetrafluoroethylene (PTFE) particles, polyvinylidene fluoride particles, and alkyl(meth)acrylate particles.

In one preferred embodiment, methyl methacrylate particles are used. These comprise greater than 50 weight percent, preferably greater than 70 weight percent, and more preferably greater than 80 weight percent methyl methacrylate units and 0.5 to 20 percent, preferably 1 to 10 percent, of a monomer possessing at least two C=C double bonds acting as crosslinking agent. This may for example be 1,4-butanediol di(meth)acrylate, ethylene glycol di(meth) acrylate, tetraethylene glycol di(meth)acrylate, propylene glycol di(meth)acrylate, pentaerythritol tetra(meth)acrylate, allyl methacrylate or divinylbenzene. In another embodiment, acrylic copolymers containing a majority of acrylate are used. Butyl acrylate is the preferred acrylate. The acrylic copolymers can be used in a core shell bead composition.

The crosslinked polymer based on methyl methacrylate or other alkyl(meth)acrylates advantageously includes from 0 to 20% of a comonomer having at least one ethylenic unsaturation copolymerizable with methyl methacrylate, chosen from styrene, alpha-methylstyrene, acrylonitrile, a $C_1$-$C_{10}$ alkyl(meth)acrylate, such as for example methyl acrylate, ethyl (meth)acrylate, butyl (meth)acrylate, benzyl (meth)acrylate, 2-hydroxyethyl (meth)acrylate and phenyl (meth)acrylate. Styrene, α-methylstyrene, benzyl methacrylate and phenyl methacrylate are monomers of choice for modifying the refractive index of the methyl-methacrylate-based particles.

Useful methyl-methacrylate-based scattering particles are advantageously prepared by polymerization in a dispersed medium, such as suspension polymerization and emulsion polymerization, according to a recipe given for example in the document EP 1 022 115, US 2002/0123565 or US 2002/0123563. The methyl-methacrylate-based scattering particles are substantially spherical. The mean diameter of the particles can be adjusted during synthesis by adjusting parameters known to those skilled in the art, such as for example the stirring speed or the amount of suspension agent.

In one preferred embodiment, the polymer matrix and organic diffusing particles are R.I.-mismatched acrylic polymers.

Inorganic Particles

The white pigment useful in the invention aids in the diffusion of light. White pigments include, but are not limited to, barium sulfate, silicon dioxide, calcium carbonate, aluminum oxide, titanium dioxide, zinc oxide, silicates, natural and synthetic clay systems (aluminosilicates) for example montmorillonite, and mixtures thereof.

The white pigment is present in the light-diffusing sheet at from 0.001 to 15 weight percent, preferably from 0.01 to 10 weight percent, and most preferably from 0.1 to 8 weight percent, based on the total light diffusing composition.

The white pigment useful in the invention has a particle size that is large enough to diffuse the full visible light spectrum and avoid color emission. In general this would be an average particle size of at least 550 nanometers. The average particle size is less than 25 microns. Preferably the average particle size is from 1 to 20 microns and more preferably from 2 to 15 microns. The average particle size of the inorganic particles is expressed as the median diameter $d_{50}$, which is measured using laser diffraction.

Brighteners

The diffusing material of the invention may optionally contain brighteners. The addition of small amounts of brighteners, can significantly improve the color of the diffused light transmitted through the diffusing material of the invention.

Useful brighteners are those white pigments with particle sizes in the nanoscale range. Particles in the 10-300 nm average particle size are especially useful. Examples of nano-scale brighteners useful in the invention include, but are not limited to nano titanium dioxide, and nano zinc compounds, including but not limited to nano zinc borate.

The brighteners are present in the composition of the diffusing material at from 0.00001 to 1 weight percent, preferably from 0.0001-0.5 weight percent, and more preferably from 0.001 to 0.1 weight percent, based on the weight of the total diffusing composition.

Processing

The composition of the invention is formed by blending the matrix polymer, organic diffusing particles, inorganic diffusing particles and other additives to form the light-diffusing composition. The components may be blended by means known in the art. In one embodiment, the various components are melt compounded in an extruder. Two or more of the components could be physically pre-blended, followed by blending in the melt stage. The composition can then be extruded or injection/compression molded directly into articles, or into sheets, films, profiles, or pellets that can be further processed into articles.

The light diffusing composition could be used as a monolithic sheet or article, or can be co-extruded (or laminated or otherwise adhered) with other thermoplastics to form a light-diffusing composite. The light-diffusing sheet could be used to form a middle (or inner) layer of a multi-layer sheet, or may form both outer layers of a sheet having three or more layers. Diffusion films of the invention are in the thickness range of from 25 microns to 500 microns, preferably from 40 microns to 300 microns. A sheet or profile of the composition of the invention could be from 0.5 to 5 mm in thickness.

The light-diffusing composition of the present invention shows synergistic properties from the use of both organic light-diffusing particles and inorganic light-diffusing particles in a single thermoplastic matrix.

The diffusing material of the invention is translucent, and will have a luminous (optical) transmission of greater than 40%; an optical haze of greater than 90%, and a diffuse light scattering of greater than 85%. Preferably, the diffusing materials will have a luminous transmission of greater than 45%; an optical haze of greater than 95%, and a diffuse light scattering of greater than 90%. The parameters of percent loading, types of particles, and material thickness can be adjusted, as would be known in the art. For example, a thicker material could have a lower particle loading, and still have the same overall transmission, haze and light scattering of a thinner material with higher loading.

There are several methods known to those skilled in the art for producing the diffusion covering material of the invention. The organic and inorganic diffusing particles and optional other particles and additives (dye(s), impact modifier, UV stabilizer, antioxidant, etc.) are mixed with the transparent plastic matrix polymer by means of an extruder or any other mixing tool suitable for thermoplastics as known to those skilled in the art. Recovered at the exit of the extruder are granules that are then formed to the desired shape using a conversion technique for thermoplastics, for example injection molding or compression molding. It is also possible to adapt the extruder in order to produce a sheet. This sheet is then formed to the desired shape after cutting and/or thermoforming.

The cover may have a variety of different geometries, depending on the nature of the intended application. For example, it may be in the form of a flat, curved or domed sheet, whether rectangular or circular, in the form of a disc, etc. It may also take the form of a letter of the alphabet or of any other sign or symbol in the case of an illuminated sign.

The cover generally has a thickness of between 0.025 and 15 mm, preferably between 0.050 and 10 mm, more preferably between 0.075 and 5 mm and even more preferably between 0.1 and 4 mm. A thin film could be used as a covering, such as in a flexible film structure hanging below a point light source as a room lighting, for example as a curved film. Thicker covers may be injection molded, or thermoformed into a variety of shapes. One of ordinary skill in the art can imagine many ways to form the cover composition of the invention into a useful diffusion covering.

Uses

The composition of the invention is used to form a covering for a point light source. The light source plus cover forms a luminous device. The cover may be a single layer, or may be a multi-layer structure. The cover is separated from the light source by a distance of between 0.5 and 40 cm, preferably between 1 and 30 cm, preferably between 2 and 20 cm and even more preferably between 3 and 10 cm.

The luminous device according to the invention has a variety of applications such as, for example:
  interior lighting (living room lamps, office lamps, etc.);
  advertising displays;
  illuminated signs (in this case, the cover may especially have the form of a letter, a number, a symbol or any other sign); and
  automobile lighting (for example the luminous device may be a headlamp, a daytime light, a direction indicator, a stop light, a fog lamp, reversing light, etc.)
  backlighting units in desktop monitors and LCD TVs

EXAMPLES

PLEXIGLAS V045, V920 and DR are polymer matrices with a refractive index of 1.489. PARALOID EXL5136 (Dupont) is a acrylic bead with a mean particle size of 7 um and a refractive index of 1.463. Acrylic and styrenic beads were obtained from Sekisui Plastics, SMX-5R is a bead with a mean particle size of 5 um and a refractive index of 1.555. BaSO4 was obtained from Cimbar or Sachtleben with various particle sizes and a refractive index of 1.64. Zinc borate was obtained from Lord's Additives Diffusion material samples were obtained by melt compounding the components, followed by injection molding plaques of various thicknesses. The compounding die temperature was controlled at 200-220° C. using a Leistritz 27 mm twin screw extruder under vacuum at the line speed of 50 lbs/hr under the shear of 250-350 rpm. Samples of thicknesses ranging from 0.020" to 0.125" were injection molded using a 90T Engel injection molder, with the die temperature of 226-232° C.

The melt flow rate values of the diffusion resins were measured under 230° C./3.8 kg using Instron Ceast MF30.

Optical haze was measured using BYK Haze Gardner. The optical transmission spectra was measured from 300 to 800 nm using Perkin Elmer Lambda 950 with a 150 mm integrating sphere. The luminous (or light) transmission data was reported at 560 nm (in a photopic region). The diffuse light scattering was calculated from $(T_0-T_2)/T_0$, where $T_0$ stood for the optical transmission with the sample located at 0-inch from the integrated sphere, and $T_2$ stood for the optical transmission with the sample located at 2-inches from the integrated sphere.

X-Rite Color-Eye 7000A instrument was used to measure the optical color parameters including $L^*$, $a^*$, $b^*$, yellowing index (YI) under ASTM-E313, and Y in a transmission mode or in a reflection mode.

A Konica Minolta CA-2500 CCD 2D Color Analyzer was used to accurately measure 2D optical luminance Lv (brightness), luminance distribution, chromaticity distribution, dominant wavelength, and correlated color temperature (CCT) from LED illuminated diffusion sheets for LED lighting applications. It is extremely sensitive to identify "hot spots" created from LED illuminated diffusion sheets in direct LED lighting. The "hot spots" suppression becomes critical towards the success of diffusion sheet/profile designs, which is associated with the optimization of diffusion resin formulations, thickness, LED light source location, and others in any LED lighting design.

Example 1 (15 wt. % 7 um PARALOID EXL5136 and 2 wt. % 3 um BaSO4 in PMMA)

A diffusing product containing 15 wt. % of 7 um EXL5136 and 2 wt. % of 3 um BaSO4 diffusion particles in A diffusing product containing 2 wt. % of 3 um BaSO4 diffusion particles in PLEXIGLAS V045-100 was compounded and injection molded in variable thickness samples, ranging from 0.030" to 0.125". The melt flow rate of the pellets was measured at 1.35 g/10 minutes at 230° C./3.8 kg.

The optical haze values from the variable thickness samples were measured at ~100% (saturated). The luminous transmission was measured over 40.0% at all tested thicknesses. The diffuse light scattering was measured over 87% at the thickness of 0.030" or higher.

The data is compiled in Table 1.

TABLE 1

| | | | | | | | | | |
|---|---|---|---|---|---|---|---|---|---|
| | Optical performance data | | | | | | | | |
| Thickness | Haze | $L^*$ | $a^*$ | $b^*$ | YI-E313 | Y | T (0)%: 0 inch | T(2)%: 2 inch | $[T(0) - T(2)]/T(0)$ |
| 0.030" | 101.0 | 93.09 | 0.32 | 0.18 | −0.11 | 83.173 | 77.397 | 9.6216 | 87.57% |
| 0.040" | 101.0 | 90.39 | 0.39 | 0.26 | 0.84 | 77.143 | 70.952 | 6.2617 | 91.17% |
| 0.060" | 101.0 | 85.26 | 0.40 | 0.77 | 1.96 | 66.513 | 60.247 | 3.7267 | 93.81% |
| 0.080" | 102.0 | 81.19 | 0.36 | 1.00 | 2.50 | 58.818 | 52.897 | 2.876 | 94.56% |
| 0.100" | 102.0 | 77.80 | 0.29 | 1.13 | 2.84 | 52.878 | 47.356 | 2.47 | 94.78% |
| 0.125" | 102.0 | 74.23 | 0.24 | 1.41 | 3.55 | 47.064 | 42.349 | 2.2199 | 94.76% |

Comparative Example 1. (40 wt. % PARALOID EXL5136 in PMMA)

A diffusing product containing 40 wt. % of 7 um EXL5136 diffusion particles in A diffusing product containing 2 wt. % of 3 um BaSO4 diffusion particles in PLEXIGLAS V920-100 was compounded and injection molded in variable thickness samples, ranging from 0.030" to 0.125". The optical haze values from the variable thickness samples were measured near ~100% (saturated). The luminous transmission was measured over 40.0% at all tested thicknesses.

Data is compiled in Table 1A. It shows that the use of EXL5136 as the only diffusion particles can lead to diffusion covers with diffuse light scattering over 87% at the thickness of 0.040" or higher, which is a higher thickness requirement in order to reach the same level of diffuse light scattering described in Example 1. In addition, the required loading of EXL5136 is comparative example 1 is very high at 40 wt. %, which imparts an undesirable yellowing color shift. The combination of EXL5136 and BaSO4 offers a synergistic effect, which allows better diffuse light scattering, luminous transmission, and color properties, than the use of EXL5136 alone.

TABLE 1A

Optical performance data (for comparative example 1)

| Thickness | Haze | L* | a* | b* | YI-E313 | Y | T(0)%: 0 inch | T(2)%: 2 inch | [T(0) − T(2)]/T(0) |
|---|---|---|---|---|---|---|---|---|---|
| 0.030" | 100.0 | 96.03 | 0.11 | 0.01 | 0.10 | 90.083 | 86.798 | 14.052 | 83.81% |
| 0.040" | 101.0 | 93.69 | 0.15 | 0.75 | 1.58 | 84.545 | 80.076 | 8.0803 | 89.91% |
| 0.060" | 101.0 | 89.63 | 0.19 | 1.58 | 3.34 | 75.506 | 70.308 | 5.1983 | 92.61% |
| 0.080" | 102.0 | 86.27 | 0.18 | 2.15 | 4.60 | 68.531 | 62.323 | 4.058 | 93.49% |
| 0.100" | 102.0 | 81.93 | 0.16 | 2.66 | 5.89 | 60.166 | 54.373 | 3.082 | 94.33% |
| 0.125" | 102.0 | 78.06 | 0.09 | 3.04 | 6.88 | 53.314 | 48.088 | 2.636 | 94.52% |

Comparative Example 2. (2 wt. % 3 um BaSO4 in PMMA)

A diffusing product containing 2 wt. % of 3 um BaSO4 diffusion particles in PLEXIGLAS V045-100 was compounded and injection molded in variable thickness samples, ranging from 0.030" to 0.125". The optical haze values from the variable thickness samples were measured close to ~100% (saturated) using a BYK Haze meter. The luminous transmission was measured over 40.0% at all tested thicknesses.

Data is compiled in Table 2. It shows that the use of BaSO4 as the only diffusion particles can lead to diffusion covers with diffuse light scattering over 87% at the thickness of 0.060" or higher, which is a higher thickness requirement in order to reach the same level of diffuse light scattering described in Example 1. The use of BaSO4 only does not allow to reach as good a balance of diffuse light scattering and luminous transmission, as the combination of BaSO4 and EXL5136 particles used in Example 1. Increasing the loading of BaSO4 used in comparative example 2 has been showed to be too detrimental to luminous transmission to be useful. Combinations of BaSO4 and EXL5136 offer a synergistic effect, which allows better diffuse light scattering and luminous transmission, than the use of BaSO4 alone.

TABLE 2

Optical performance data (for comparative example 2)

| Thickness | Haze | L* | a* | b* | YI-E313 | Y | T(0)%: 0 inch | T(2)%: 2 inch | [T(0) − T(2)]/T(0) |
|---|---|---|---|---|---|---|---|---|---|
| 0.030" | 99 | 94.90 | 0.20 | 0.15 | −0.13 | 87.373 | 81.823 | 17.1 | 79.10% |
| 0.040" | 100 | 93.37 | 0.24 | 0.23 | 0.64 | 83.822 | 78.116 | 12.172 | 84.42% |
| 0.060" | 101 | 89.01 | 0.33 | 1.14 | 2.60 | 74.185 | 68.398 | 6.4634 | 90.55% |
| 0.080" | 101 | 84.56 | 0.39 | 1.59 | 3.70 | 65.139 | 60.142 | 4.3178 | 92.82% |
| 0.100" | 101 | 80.88 | 0.38 | 2.00 | 4.71 | 58.256 | 53.943 | 3.3866 | 93.72% |
| 0.125" | 102 | 76.66 | 0.35 | 2.45 | 5.92 | 50.970 | 47.504 | 2.723 | 94.27% |

Example 3 (10% 7 um PARALOID EXL5136 and 1.5% 1.2 um BaSO4 in PMMA)

A diffusing product containing 10 wt. % of 7 um EXL5136 and 1.5 wt. % of 1.2 urn BaSO4 diffusion particles in A diffusing product containing 2 wt. % of 3 um BaSO4 diffusion particles in PLEXIGLAS V045-100 was compounded and injection molded in variable thickness samples, ranging from 0.030" to 0.125". The melt flow rate of the pellets was measured at 1.5 g/10 minutes at 230° C./3.8 kg.

The optical haze values from the variable thickness samples were measured at ~100% (saturated). The luminous transmission was measured over 40.0% at all tested thicknesses. The diffuse light scattering was measured at about 85% and over when the thickness was 0.030" or higher.

The data is compiled in Table 3.

TABLE 3

Optical performance data

| Thickness | Haze | L* | a* | b* | YI-E313 | Y | T(0)%: 0 inch | T(2)%: 2 inch | [T(0) − T(2)]/T(0) |
|---|---|---|---|---|---|---|---|---|---|
| 0.030" | 101.0 | 93.47 | 0.28 | 0.14 | 0.50 | 84.05 | 78.29 | 11.820 | 84.90% |
| 0.040" | 101.0 | 90.66 | 0.40 | 0.82 | 1.96 | 77.73 | 71.688 | 7.254 | 89.88% |
| 0.060" | 101.0 | 85.92 | 0.50 | 1.44 | 3.43 | 67.83 | 61.832 | 4.219 | 93.18% |
| 0.080" | 101.0 | 81.58 | 0.48 | 1.69 | 4.11 | 59.53 | 53.985 | 3.078 | 94.30% |
| 0.100" | 102.0 | 78.12 | 0.41 | 1.81 | 4.46 | 53.42 | 48.554 | 2.566 | 94.72% |
| 0.125" | 102.0 | 74.36 | 0.35 | 2.06 | 5.15 | 47.27 | 43.088 | 2.253 | 94.77% |

Figure 1:
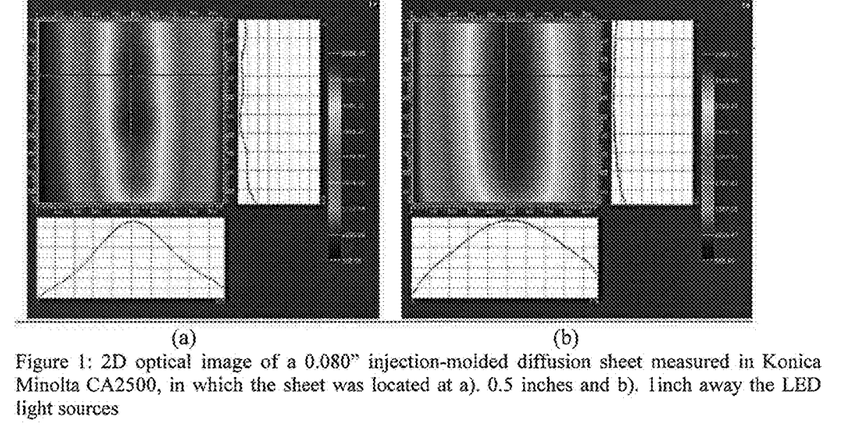
FIG. 1: 2D optical image of a 0.080" injection-molded diffusion sheet of Example 3 measured in Konica Minolta CA2500, in which the sheet was located at a). 0.5 inches and b). 1 inch away the LED light sources

A Konica Minolta CA2500 2D photometer was used to measure the luminance and luminance distribution from the LED illuminated diffusing sheets. The distance from LED light sources to the 2D detector was fixed at 12.5 inches. As showed on FIG. 1, a 0.08" IM plaque containing the mixture of 7 um EXL5136 and 1.2 um BaSO4 diffusion beads exhibited quite good optical hiding performance from LED illuminated diffusion sheet, in which the sample was located only at 0.5 inch away from the LED light sources. The maximum luminance (6,084 cd/m$^2$), and average luminance (3,177 cd/m$^2$) were detected, without seeing individual hot spots, along with its luminance distribution from the LED illuminated diffusion sheet. The correlated color temperature (CCT) was measured at 4121° Kevin. When the sample was moved to 1 inch away from the LED light sources, the maximum luminance (3,490 cd/m$^2$), average luminance (2,518 cd/m$^2$), and CCT (4,079° K) were detected, along with its broad luminance distribution from this 0.08" diffusion sheet under the same condition.

Example 4 (15% PARALOID EXL5136+3% 3 um BaSO4 in PMMA)

A diffusing product containing 15 wt. % of 7 um EXL5136 and 3 wt. % of 3 um BaSO4 diffusion particles in A diffusing product containing 2 wt. % of 3 um BaSO4 diffusion particles in PLEXIGLAS V045-100 was compounded and injection molded in variable thickness samples, ranging from 0.030" to 0.125". The melt flow rate of the pellets was measured at 1.4 g/10 minutes at 230° C./3.8 kg.

The optical haze values from the variable thickness samples were measured at ~400% (saturated). The luminous transmission was measured over 40.0% at all tested thicknesses, except for 0.125", which was slightly outside of the scope of the invention at 39.3%. The diffuse light scattering was measured over 92% when the thickness was above 0.030" or higher.

The data is compiled in Table 4.

TABLE 4

Optical performance data

| Thickness | Haze | L* | a* | b* | YI-E313 | Y | T(0)%: 0 inch | T(2)%: 2 inch | [T(0) − T(2)]/T(0) |
|---|---|---|---|---|---|---|---|---|---|
| 0.030" | 101 | 89.13 | 0.38 | 0.53 | 1.39 | 74.44 | 67.691 | 4.907 | 92.75% |
| 0.040" | 101 | 86.43 | 0.38 | 0.76 | 1.9 | 68.86 | 62.42 | 3.8645 | 93.81% |

TABLE 4-continued

| | | | | | | | T(0)%: | T(2)%: | [T(0) − |
| Thickness | Haze | L* | a* | b* | YI-E313 | Y | 0 inch | 2 inch | T(2)]/T(0) |
| --- | --- | --- | --- | --- | --- | --- | --- | --- | --- |
| 0.060" | 101 | 81.76 | 0.3 | 0.95 | 2.34 | 59.85 | 54.538 | 2.7958 | 94.87% |
| 0.080" | 101 | 78.5 | 0.22 | 1.13 | 2.75 | 54.07 | 49.538 | 2.424 | 95.11% |
| 0.100" | 102 | 74.2 | 0.13 | 1.5 | 3.66 | 47.02 | 44.012 | 2.137 | 95.14% |
| 0.125" | 101 | 70.22 | 0.07 | 1.96 | 4.89 | 41.06 | 39.328 | 1.96 | 95.02% |

Figure 2:
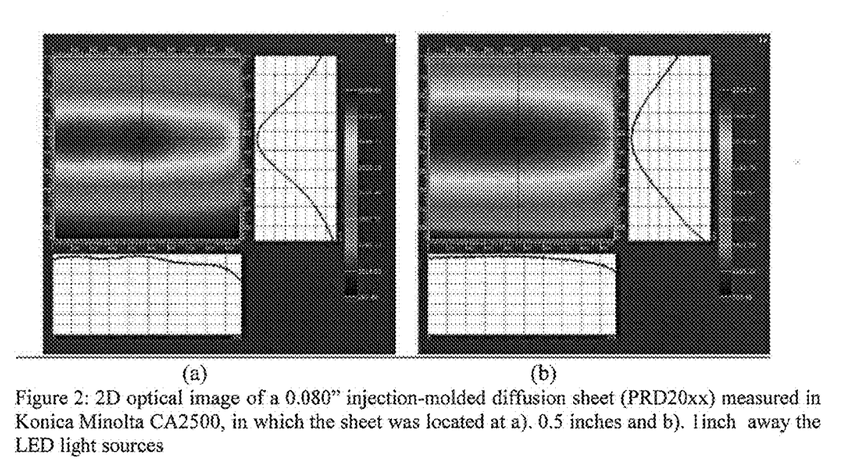
FIG. 2: 2D optical image of a 0.080" injection-molded diffusion sheet of Example 4 measured in Konica Minolta CA2500, in which the sheet was located at a). 0.5 inches and b). 1 inch away the LED light sources

A Konica Minolta CA2500 2D photometer was used to measure the luminance and luminance distribution from the LED illuminated diffusing sheets. The distance from LED light sources to Konica Minolta CA2500 2D detector was fixed at 12 inches. As shown on FIG. 2, a 0.08" injection molded plaque containing the mixture of 7 um EXL5136 and 3 um BaSO4 diffusion beads exhibited quite good optical hiding performance from LED illuminated diffusion sheet, in which the sample was located only at 2-cm away from the LED light sources. The maximum luminance (3,906 cd/m$^2$), and average luminance (2.435 cd/m$^2$) were achieved, along with its broad luminance distribution from the LED illuminated diffusion sheet. The correlated color temperature (CCT) was measured at 4163° Kevin. When the sample was moved to 1 inch away from the LED light sources, the maximum luminance (3,276 cd/m$^2$), average luminance (2,416 cd/m$^2$), and CCT (4,131° K) were detected, along with its broad luminance distribution from this 0.080" thin diffusion sheet under the same condition.

Example 5 (15% PARALOID EXL5136+2% 3 um BaSO4 in Impact Modified PMMA)

A diffusing product containing 15 wt. % of 7 um EXL5136 and 2 wt. % of 3 um BaSO4 diffusion particles in A diffusing product containing 2 wt. % of 3 um BaSO4 diffusion particles in PLEXIGLAS DR was compounded and injection molded in variable thickness samples, ranging from 0.030" to 0.125". The melt flow rate of the pellets was measured at 1.1 g/10 minutes at 230° C./3.8 kg.

The optical haze values from the variable thickness samples were measured at ~100% (saturated). The luminous transmission was measured over 40.0% at all tested thicknesses. The diffuse light scattering was measured over 85% when the thickness was above 0.030" or higher.

The data is compiled in Table 5

Figure 3:
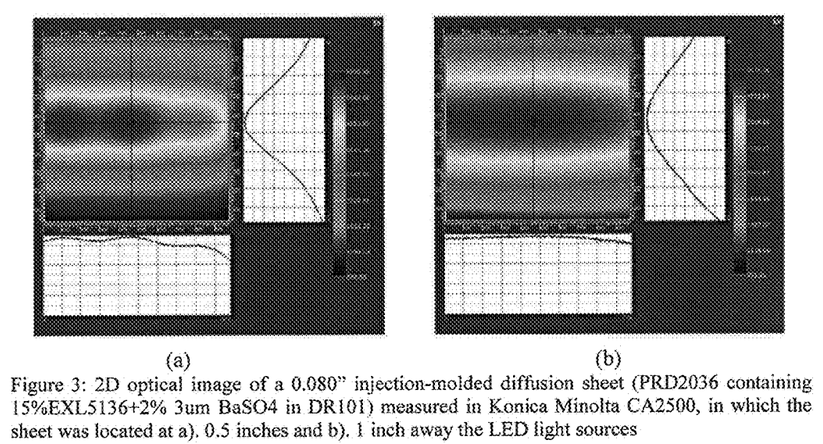
FIG. 3: 2D optical image of a 0.080" injection-molded diffusion sheet of Example 5 containing 15% EXL5136+2% 3 um BaSO4 in DR101) measured in Konica Minolta CA2500, in which the sheet was located at a). 0.5 inches and b). 1 inch away the LED light sources

A Konica Minolta CA2500 2D photometer was used to measure the luminance and luminance distribution from the LED illuminated diffusing sheets. The distance from LED light sources to the CA2500 2D detector was fixed at 12 inches. As showed on FIG. 3, a 0.0825" injection molded plaque containing the mixture of 15% 7 um EXL5136 and 10% 3 um BaSO4 diffusion beads exhibited quite good optical hiding performance from LED illuminated diffusion sheet, in which the sample was located only at 0.5 inches away from the LED light sources. The maximum luminance (6,398 cd/m$^2$), average luminance (3,333 cd/m$^2$), and CCT (4,186° K) were detected using a Konica Minolta CA2500 2D photometer, along with its broad luminance distribution from the illuminated diffusion sheet. When the sample was moved to 1 inch away from the LED light sources, the maximum luminance (3,631 cd/m$^2$), average luminance (2,640 cd/m$^2$), and CCT (4,161° K) were detected, along with its broad luminance distribution from this 0.0825" thin diffusion sheet under the same condition.

Example 6 (15% PARALOID EXL5136+8% 3 um BaSO4 in Impact Modified PMMA)

A diffusing product containing 15 wt. % of 7 um EXL5136 and 8 wt. % of 3 um BaSO4 diffusion particles in A diffusing product containing 2 wt. % of 3 um BaSO4 diffusion particles in PLEXIGLAS DR was compounded and injection molded in variable thickness samples, ranging from 0.030" to 0.125". The melt flow rate of the pellets was measured at 1.2 g/10 minutes at 230° C./3.8 kg.

The optical haze values from the variable thickness samples were measured at ~100% (saturated). The luminous transmission was measured over 40.0% at thicknesses of 0.060" and less, showing that this specific material composition with fairly high loadings of both EXL and BaSO4 is out of the scope of the invention at higher thicknesses. The diffuse light scattering was measured over 94% when the thickness was above 0.030" or higher.

The data is compiled in Table 6.

TABLE 5

| | | | | | | | T(0)%: | T(2)%: | [T(0) − |
| Thickness | Haze | L* | a* | b* | YI-E313 | Y | 0 inch | 2 inch | T(2)]/T(0) |
| --- | --- | --- | --- | --- | --- | --- | --- | --- | --- |
| 0.030" | 101 | 93.53 | 0.25 | 0.06 | 0.31 | 84.179 | 78.259 | 10.186 | 86.98% |
| 0.040" | 101 | 90.16 | 0.33 | 0.62 | 1.52 | 76.643 | 70.300 | 6.215 | 91.16% |
| 0.060" | 101 | 84.78 | 0.35 | 1.02 | 2.45 | 65.576 | 59.448 | 3.764 | 93.67% |
| 0.080" | 101 | 80.53 | 0.29 | 1.19 | 2.89 | 57.619 | 51.900 | 2.903 | 94.41% |
| 0.100" | 101 | 77.06 | 0.23 | 1.31 | 3.21 | 51.634 | 46.645 | 2.482 | 94.68% |

TABLE 6

Optical performance data

| Thickness | Haze | L* | a* | b* | YI-E313 | Y | T(0)%: 0 inch | T(2)%: 2 inch | [T(0) − T(2)]/T(0) |
|---|---|---|---|---|---|---|---|---|---|
| 0.030" | 101 | 84.75 | 0.45 | 0.41 | 1.26 | 65.510 | 58.863 | 3.137 | 94.67% |
| 0.040" | 102 | 81.58 | 0.39 | 0.66 | 1.79 | 59.529 | 53.741 | 2.551 | 95.25% |
| 0.060" | 101 | 75.74 | 0.35 | 1.30 | 3.35 | 49.459 | 45.700 | 2.060 | 95.49% |
| 0.080" | 101 | 71.31 | 0.37 | 1.95 | 5.08 | 42.647 | 39.986 | 1.820 | 95.45% |
| 0.100" | 101 | 67.52 | 0.42 | 2.55 | 6.87 | 37.323 | 35.237 | 1.635 | 95.36% |
| 0.125" | 101 | 63.26 | 0.53 | 3.05 | 8.65 | 31.900 | 30.600 | 1.460 | 95.23% |

Figure 4:
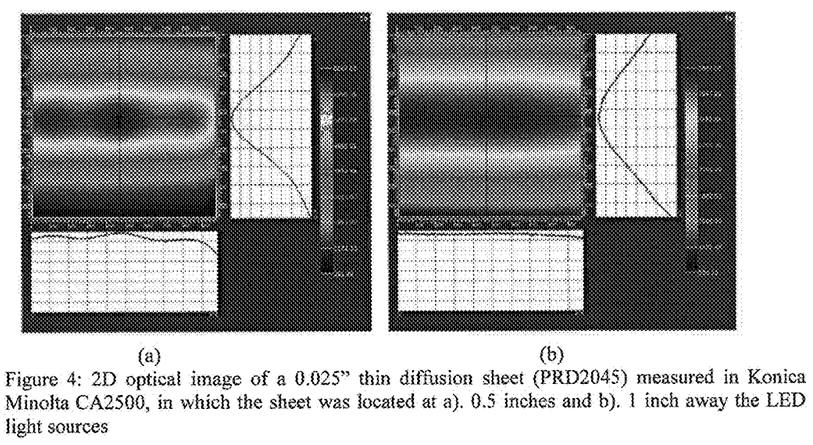
FIG. 4: 2D optical image of a 0.025" thin diffusion sheet of Example 6 measured in Konica Minolta CA2500, in which the sheet was located at a). 0.5 inches and b). 1 inch away the LED light sources

A Konica Minolta CA2500 2D photometer was used to measure the luminance and luminance distribution from the LED illuminated diffusing sheets. The distance from LED light sources to the CA2500 2D detector was fixed at 12 inches. As shown on FIG. 4, a 0.025" injection molded plaque containing the mixture of 15% 7 um EXL5136 and 8% 3 um BaSO4 diffusion beads exhibited quite good optical hiding performance from LED illuminated diffusion sheet, in which the sample was located only at 0.5 inches away from the LED light sources. The maximum luminance (6,917 cd/m$^2$), average luminance (3,473 cd/m$^2$), and CCT (4,155° K) were detected using a Konica Minolta CA2500 2D photometer, along with its broad luminance distribution from the illuminated 0.025" thin diffusion sheet. When the sample was moved to 1 inch away from the LED light sources, the maximum luminance (3,944 cd/m$^2$), average luminance (2,783 cd/m$^2$), and CCT (4,149° K) were detected, along with its broad luminance distribution from this 0.025" thin diffusion sheet under the same condition.

Example 7 (15% PARALOID EXL5136+10% 3 um BaSO4 in Impact at Modified PMMA)

A diffusing product containing 15 wt. % of 7 um EXL5136 and 8 wt. % of 3 um BaSO4 diffusion particles in A diffusing product containing 2 wt. % of 3 um BaSO4 diffusion particles in PLEXIGLAS DR was compounded films were extruded in the thickness range of 0.015" and 0.020", using a film extrusion line with a die temperature of 210 C. The melt flow rate of the pellets was measured at 1.1 g/10 minutes at 230° C./3.8 kg.

The optical haze values from the variable thickness samples were measured at ~100% (saturated). The luminous transmission was measured over 40.0% at the thicknesses of 0.06 and less, making higher thicknesses too high for the scope of the invention. The luminous light scattering was measured at over 93% when the thickness was at 0.015" and higher.

The data is compiled in Table 7.

Figure 5:
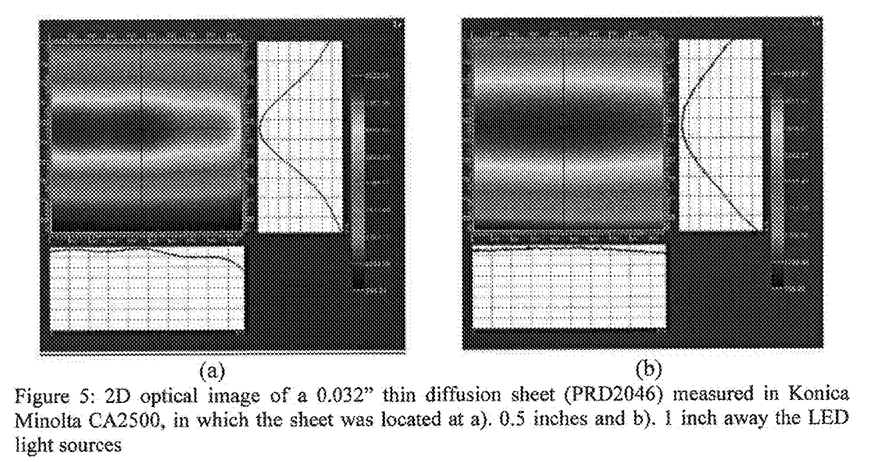
FIG. 5: 2D optical image of a 0.032" thin diffusion sheet of Example 7 measured in Konica Minolta CA2500, in which the sheet was located at a). 0.5 inches and b). 1 inch away the LED light sources.

A Konica Minolta CA2500 2D photometer was used to measure the luminance and luminance distribution from the LED illuminated diffusing sheets. The distance from LED light sources to the CA2500 2D detector was fixed at 12 inches. As shown on FIG. 5, a 0.032" injection molded plaque containing the mixture of 15% 7 um EXL5136 and 10% 3 um BaSO4 diffusion beads exhibited quite good optical hiding performance from LED illuminated diffusion sheet, in which the sample was located only at 0.5 inches away from the LED light sources. The maximum luminance (6,022 cd/m$^2$), average luminance (3,144 cd/m$^2$), and CCT (4,156° K) were detected using a Konica Minolta CA2500 2D photometer, along with its broad luminance distribution from the LED illuminated thin diffusion sheet. When the sample was moved to 1 inch away from the LED light sources, the maximum luminance (3,336 cd/m$^2$), average luminance (2,434 cd/m$^2$), and CCT (4,146° K) were detected, along with its broad luminance distribution from this 0.032" thin diffusion sheet under the same condition.

Example 8 (1 wt. % SMX-5R+3 wt. % 3 um BaSO4 in V045 PMMA)

A diffusing product containing 1 wt. % of 5 um SMX-5R and 3 wt. % of 3 um BaSO4 diffusion particles in A diffusing product containing 2 wt. % of 3 um BaSO4 diffusion particles in PLEXIGLAS V045 was compounded and injection molded into the plaques ranged from 0.030" and 0.125" thicknesses. The melt flow rate of the pellets was measured at 1.8 g/10 minutes at 230° C./3.8 kg.

The optical haze values from the variable thickness samples were measured at ~100% (saturated). The luminous transmission was measured over 40.0% at all thicknesses. The luminous light scattering was measured at over 85% when the thickness was at 0.030" and higher.

The data is compiled in Table 8.

TABLE 7

Optical performance data

| Thickness | Haze | L* | a* | b* | YI-E313 | Y | T(0)%: 0 inch | T(2)%: 2 inch | [T(0) − T(2)]/T(0) |
|---|---|---|---|---|---|---|---|---|---|
| 0.015" | 101 | 88.25 | 0.37 | 0.52 | 1.38 | 72.59 | 65.53 | 4.305 | 93.43% |
| 0.020" | 101 | 84.85 | 0.35 | 0.79 | 1.98 | 65.72 | 59.05 | 3.084 | 94.78% |
| 0.030" | 101 | 80.29 | 0.34 | 1.24 | 3.04 | 57.192 | 52.51 | 2.435 | 95.36% |
| 0.040" | 101 | 76.87 | 0.31 | 1.68 | 4.12 | 51.320 | 47.72 | 2.145 | 95.50% |
| 0.060" | 101 | 71.79 | 0.30 | 2.56 | 6.45 | 43.343 | 40.81 | 1.831 | 95.51% |
| 0.080" | 101 | 66.80 | 0.31 | 3.39 | 8.89 | 36.373 | 34.81 | 1.567 | 95.50% |
| 0.100" | 101 | 62.86 | 0.42 | 3.47 | 9.67 | 31.421 | 30.59 | 1.392 | 95.45% |
| 0.125" | 101 | 57.97 | 0.30 | 5.36 | 15.25 | 25.928 | 25.51 | 1.184 | 95.36% |

TABLE 8

Optical performance data

| Thickness | Haze | L* | a* | b* | YI-E313 | Y | T(0)%: 0 inch | T(2)%: 2 inch | [T(0) − T(2)]/T(0) |
|---|---|---|---|---|---|---|---|---|---|
| 0.030" | 101.0 | 91.84 | 0.34 | 0.81 | 1.88 | 80.348 | 75.63 | 8.129 | 89.25% |
| 0.040" | 101.0 | 88.45 | 0.42 | 1.26 | 2.91 | 73.005 | 67.56 | 4.969 | 92.64% |
| 0.060" | 102.0 | 82.69 | 0.44 | 1.52 | 3.65 | 61.581 | 57.46 | 3.180 | 94.47% |
| 0.080" | 102.0 | 78.63 | 0.37 | 1.62 | 3.96 | 54.297 | 50.64 | 2.555 | 94.95% |
| 0.100" | 102.0 | 74.81 | 0.31 | 1.74 | 4.35 | 47.973 | 45.61 | 2.261 | 95.04% |
| 0.125" | 102.0 | 70.95 | 0.27 | 1.95 | 5.02 | 42.114 | 40.58 | 2.046 | 94.96% |

Figure 6:
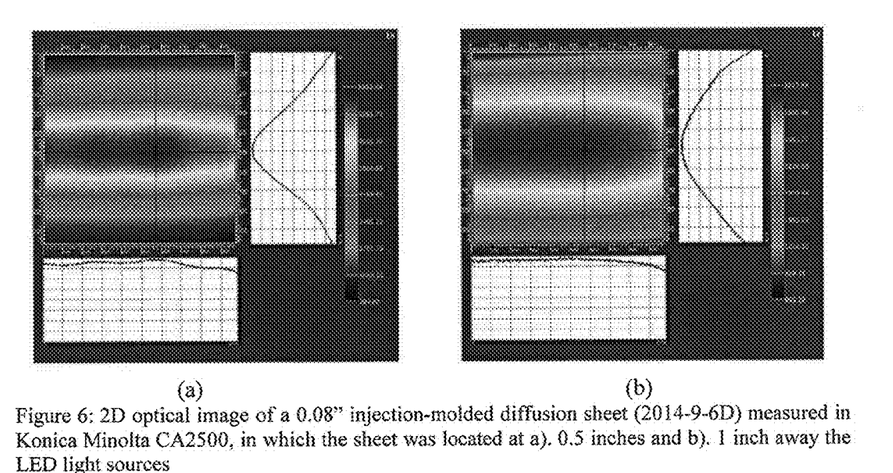
FIG. 6: 2D optical image of a 0.032" thin diffusion sheet of Example 8 measured in Konica Minolta CA2500, in which the sheet was located at a). 0.5 inches and b). 1 inch away the LED light sources.

A Konica Minolta CA2500 2D photometer was used to measure the luminance and luminance distribution from the LED illuminated diffusing sheets. The distance from LED light sources to the CA2500 2D detector was fixed at 12 inches. As showed on FIG. 6 a 0.08" injection molded plaque containing the mixture of 1 wt. % 5 um SMX-5R and 3 wt. % 3 um BaSO4 diffusion beads exhibited quite good optical hiding performance from LED illuminated diffusion sheet, in which the sample was located only at 0.5 inches away from the LED light sources. The maximum luminance (5,922 cd/m$^2$), average luminance (3,100 cd/m$^2$), and CCT (4,125° K) were detected using a Konica Minolta CA2500 2D photometer, along with its broad luminance distribution from the LED illuminated diffusion sheet. When the sample was moved to 1 inch away from the LED light sources, the maximum luminance (3,217 cd/m$^2$), average luminance (2,343 cd/m$^2$), and CCT (4,182° K) were detected, along with its broad luminance distribution from this 0.08" thin diffusion sheet under the same condition.

Example 9 (1 wt. % SMX-5R+3 wt. % 3 um BaSO4+0.01 wt. % Zinc Borate in V045 PMMA)

A diffusing product containing 1 wt. % of 5 um SMX-5R (from Sekisui), 3 wt. % of 3 um BaSO4 diffusion particles and 0.01 wt % zinc borate in A diffusing product containing 2 wt. % of 3 um BaSO4 diffusion particles in PLEXIGLAS V045 was compounded and injection molded into the plaques ranged from 0.030" and 0.125" thicknesses. The melt flow rate of the pellets was measured at 1.8 g/10 minutes at 230° C./3.8 kg.

The optical haze values from the variable thickness samples were measured at ~100% (saturated). The luminous transmission was measured over 40.0% at all thicknesses. The luminous light scattering was measured at over 85% when the thickness was at 0.030" and higher. The yellow index YI was measured lower than for the composition of example 7, demonstrating the effect of the zinc borate brightener on the color of the diffusing material.

The data is compiled in Table 9.

TABLE 9

Optical performance data

| Thickness | Haze | L* | a* | b* | YI-E313 | Y | T(0)%: 0 inch | T(2)%: 2 inch | [T(0) − T(2)]/T(0) |
|---|---|---|---|---|---|---|---|---|---|
| 0.030" | 101.0 | 91.82 | 0.34 | 0.74 | 1.74 | 80.297 | 75.00 | 7.579 | 89.89% |
| 0.040" | 101.0 | 88.36 | 0.43 | 1.22 | 2.85 | 72.825 | 67.61 | 4.967 | 92.65% |
| 0.060" | 101.0 | 83.33 | 0.43 | 1.40 | 3.36 | 62.781 | 58.03 | 3.258 | 94.38% |
| 0.080" | 102.0 | 78.82 | 0.38 | 1.43 | 3.55 | 54.613 | 50.87 | 2.602 | 94.89% |
| 0.100" | 102.0 | 75.58 | 0.34 | 1.53 | 3.87 | 49.201 | 46.04 | 2.299 | 95.01% |
| 0.125" | 102.0 | 71.88 | 0.30 | 1.70 | 4.40 | 43.488 | 41.20 | 2.101 | 94.90% |

Figure 7:
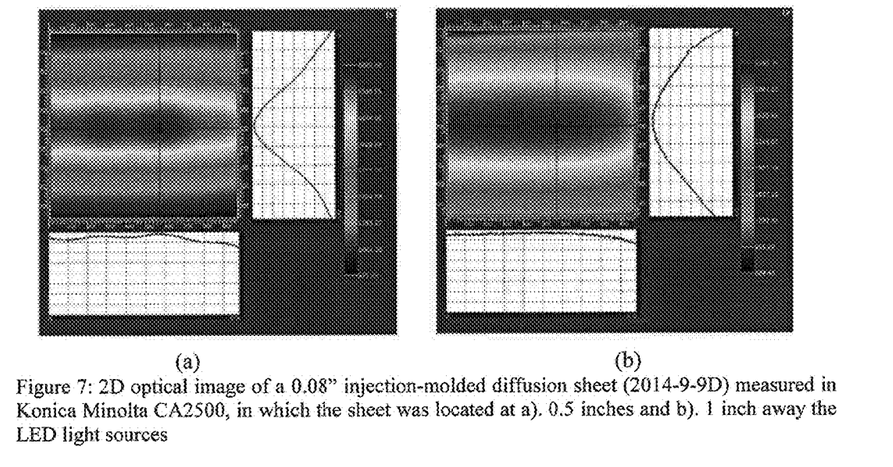
FIG. 7: 2D optical image of a 0.032" thin diffusion sheet of Example 9 measured in Konica Minolta CA2500, in which the sheet was located at a). 0.5 inches and b). 1 inch away the LED light sources.

A Konica Minolta CA2500 2D photometer was used to measure the luminance and luminance distribution from the LED illuminated diffusing sheets. The distance from LED light sources to the CA2500 2D detector was fixed at 12 inches. As showed on FIG. 7 a 0.08" injection molded plaque containing the mixture of 1 wt. % 5 um SMX-5R, 3 wt. % 3um BaSO4 diffusion beads and 0.01% zinc borate exhibited quite good optical hiding performance from LED illuminated diffusion sheet, in which the sample was located only at 0.5 inches away from the LED light sources. The maximum luminance (6,060 cd/m$^2$), average luminance (3,139 cd/m$^2$), and CCT (4,240° K) were detected using a Konica Minolta CA2500 2D photometer, along with its broad luminance distribution from the LED illuminated diffusion sheet. When the sample was moved to 1 inch away from the LED light sources, the maximum luminance (3,298 cd/m$^2$), average luminance (2,394 cd/m$^2$), and CCT (4,197° K) were detected, along with its broad luminance distribution from this 0.08" thin diffusion sheet under the same condition.

What is claimed is:

1. A translucent, light-diffusing material comprising a blend composition of
    a) a thermoplastic polymer matrix material,
    b) from 0.01 to 20 weight percent of spherical or near-spherical organic polymer diffusing particles that are refractive index (R.I.) mis-matched to the matrix polymer, wherein the absolute difference between the matrix polymer and diffusing organic polymer particles is from greater than 0.02 to 0.2,
    c) from 0.001 to 15 weight percent of inorganic diffusing particles, wherein said weight percents are based on the weight of the total light-diffusing composition, and wherein a sheet or film made with said light diffusing material has a luminous transmission of greater than 40%, an optical haze of greater than 90% and a diffuse light scattering of greater than 85%.

2. The translucent, light-diffusing material of claim 1, wherein the absolute difference between the refractive index of said matrix polymer and said organic diffusing particles is from 0.03 to 0.12.

3. The translucent, light-diffusing material of claim 1, wherein said polymer matrix is selected from the group consisting of crystal polystyrene, polyethylene terephthalate (PET), a transparent polyolefin, transparent polypropylene, acrylics, a transparent polyamide, styrene acrylonitrile (SAN), and polycarbonate.

4. The translucent, light-diffusing material of claim 1, wherein said polymer matrix is an acrylic polymer.

5. The translucent, light-diffusing material of claim 1, wherein said polymer matrix further comprises from 5 to 45 weight percent of one or more impact modifiers.

6. The translucent, light-diffusing material of claim 1, wherein said organic diffusing particles have a mean particle size of from 0.6 to 100 microns.

7. The translucent, light-diffusing material of claim 6, wherein said organic diffusing particles have a mean particle size of from 1 to 80 microns.

8. The translucent, light-diffusing material of claim 1, wherein said composition comprises from 0.1 to 10 weight percent of organic polymer diffusing particles, and from 0.01 to 10 weight percent of inorganic diffusing particles.

9. The translucent, light-diffusing material of claim 8, wherein said composition comprises from 0.2 to 8 weight percent of organic polymer diffusing particles, and from 0.1 to 8 weight percent of inorganic diffusing particles.

10. The translucent, light-diffusing material of claim 1, wherein said average particle size of said inorganic diffusing particles is from 550 nm to 25 microns.

11. The translucent, light-diffusing material of claim 1, wherein said inorganic diffusing particles are selected from the group consisting of barium sulfate, silicon dioxide, calcium carbonate, aluminum oxide, titanium dioxide, zinc oxide, silicates, natural and synthetic clays and mixtures thereof.

12. The translucent, light-diffusing material of claim 11, wherein said inorganic diffusing particles are barium sulfate.

13. The translucent, light-diffusing material of claim 1, wherein said composition further comprises from 0.00001 to 1 weight percent of one or more optical brighteners.

14. The translucent, light-diffusing material of claim 13, wherein said composition further comprises from 0.001 to 0.1 weight percent of one or more optical brighteners.

15. The translucent, light-diffusing material of claim 13, wherein said optical brighteners are selected from nano zinc oxide compounds and zinc borate.

16. The translucent, light-diffusing material of claim 13, wherein said optical brightener is zinc borate.

17. The translucent light diffusing material of claim 1, wherein said material is used as a monolithic sheet or film.

18. The translucent light diffusing material of claim 1, wherein said material is used as one layer in a two-layer sheet or film.

19. The translucent light diffusing material of claim 1, wherein said material is used as one or more layers in a sheet or film structure comprising 3 or more layers.

20. The translucent diffusing material of claim 1, wherein said material is used in forming an interior or exterior lighting fixture, an advertising display, a sign, automotive lighting, desktop monitors, LCD TVs.

* * * * *